United States Patent [19]

Anderson

[11] 3,899,579
[45] Aug. 12, 1975

[54] TREATMENT OF EMPHYSEMA, POLYARTHRITIS SYNDROME AND PECTIN RELATED DISEASES IN RUMINANTS

[76] Inventor: Eric C. Anderson, Box No. 1175, Bozeman, Mont. 59715

[22] Filed: Jan. 25, 1974

[21] Appl. No.: 436,604

[52] U.S. Cl. ............... 424/128; 424/153; 424/159; 424/180
[51] Int. Cl.² .............. A61K 31/70; A61K 33/08; A61K 33/14; A61K 33/42
[58] Field of Search ........... 424/159, 128, 153, 180

[56] References Cited
OTHER PUBLICATIONS

Milks – Veterinary Pharmacology Materia Medica & Therapeutics – 6th edit., (1949), page 452.

*Primary Examiner*—Stanley J. Friedman
*Attorney, Agent, or Firm*—Warren F. B. Lindsley

[57] ABSTRACT

A mineral mixture for treating emphysema, polyarthritis syndrome and other pectin related diseases in ruminants containing hydrated magnesium oxide, sodium chloride, and monosodium phosphate which may be added to wheat bran and dried molasses to prevent bloat.

3 Claims, No Drawings

TREATMENT OF EMPHYSEMA, POLYARTHRITIS SYNDROME AND PECTIN RELATED DISEASES IN RUMINANTS

BACKGROUND OF THE INVENTION

This invention relates to ruminants and more particularly to the treating of emphysema, calf weakness, and other related diseases and resulting deaths from bloat resulting from eating particular combinations of grains, weeds, plants, etc. during the spring and summer of the year.

Pectin, a neutral substance occurring in many vegetable tissues as part of the sap or cell wall, has an affinity for carbon dioxide and when it unites with carbon dioxide, forms a sticky substance or jel which traps gas in bubble like configuration. The build-up of trapped gas expands the rumen which can become so large that it stops the action of the heart or lungs either of which can cause death in the animal from bloat.

Delephinin, an alkaloid poison found in larkspur, is attached to the pectin in the plants and is usually in the roots and stalks of the plants in the spring and summer during its growth, and appears in the pods of the seeds in the fall. This plant is particularly deadly to cattle when eaten without a proper mineral supplement to eliminate gas trapped in the animal generated from the larkspur it has eaten.

Emphysema is another large killer of cattle, It occurs mostly when cattle are moved from dry grass to green lush pastures. This disease usally occurs during the first ten days the ruminants are in the new pasture.

It is believed that uric acid crystals, due to the change in pasture, are deposited in the respiratory tract of the animal. Since these crystals are very sharp, they create irritation in the tissues causing edema to occur and thus causing emphysema. These crystals have been observed from slides made from the lungs of cattle which have died from emphysema.

These uric acid crystals are believed to be formed in cattle moved from dry to green lush pastures for the following reasons:

Dry range grasses are very low in xanthines which form uric acid due to the enzyme xanthine oxides. Normally, uric acid is converted to allantoin by the enxyme and uricase and eliminated in this form. Animals on low xanthine containing grasses do not have much use for their uricase so their available supply of this compound is small. When they are suddenly placed on forage that are high in xanthines, they do not have enough uricase to break down the uric acid providing for the formation of uric acid crystals in their easiest place of deposition — the lungs.

After a week or ten days, the animals can build up enough uricase to eliminate uric acid as an allantoin.

In the Idaho, Montana areas of the United States, it was noticed around 1960 that calves were dying particularly from heifers having their first calf. During the first three weeks of life, the calf would become weak and not able to nurse. Diarrhea, frequent urination, hyperthermia, with scaliness around the nose usually occurred and a large percentage ate dirt. The dirt eating characteristic seemed to indicate a mineral deficiency. This deficiency was found to be magnesium.

A cow short of magnesium is going to have a calf short of magnesium. When a calf goes into its increased growth period, there is not enough magnesium for growth and the calf weakens having the above defined symptoms now known as "Weak Calf" syndrome.

FIELD OF THE INVENTION

Prior to this invention, many things have been tried to eliminate or cure bloat as well as pulmonary emphysema in cattle and the symptoms of the weak calf syndrome resulting in little or no results. In fact, prior to this invention, many thought that proteins were the cause of bloat in ruminants and that the jel or foam forming the tough viscous surface of the bubble surrounding the carbon dioxide gas in cattle, particularly was of a protein composition.

SUMMARY OF THE INVENTION

In accordance with the invention claimed, it has been discovered that the bloat in ruminants is caused by pectin and carbon dioxide and not proteins. Pectin and carbon dioxide are both plentiful in plants that cause bloat such as legumes, alfalfa, clover, barley, larkspur, etc. Plants like sanfein and vetch which do not cause bloat are high in protein but low in pectin. Pectin has a greater affinity for hydrated lime than carbon dioxide. Hydrated lime precipitates the pectin as calcium pectate preventing it from uniting with carbon dioxide and causing bloat. The combination of hydrated lime and pectin has no known ill side effects on the digestion of the animal. If magnesium is used the pectin is precipitated out as magnesium pectate.

Therefore, in accordance with the invention claimed, a new and improved method is provided for treating pectin related diseases in ruminants.

Another object of this invention is to provide a new and improved product for feeding ruminants, particularly cattle, for treating bloat, emphysema and weak calf syndrome.

Further objects and advantages of the invention will become apparent as the following description proceeds and the features of novelty which characterize this invention will be pointed out with particularity in the claims annexed to and forming part of this specification.

DESCRIPTION OF THE PREFERRED EMBODIMENT

Heretofore, it was believed that proteins were the cause of bloat in ruminants. The foam surrounding the gas bubbles formed in the animal was believed to be of a protein nature of a tough viscous type resulting in tough bubbles of carbon dioxide.

As mentioned heretofore, the bubble skin was found to be formed of a pectin which is plentiful in plants that cause bloat such as alfalfa, clover, barley, larkspur and the like while plants that do not cause bloat are low in pectin such as sanfein and vetch.

To prove this fact, carbon dioxide was bubbled through a solution of Certo (a commercial pectin) and distilled water resulting in the creation of tough viscous bubbles of the same type present in animals suffering from bloat. It has been noted that if calcium ions in the form of calcium carbonate, calcium oxide, calcium hydroxide, calcium sulfate, calcium dihydrate, slaked lime or hydrated lime or magnesium ion in the form of magnesium oxide, magnesium carbonate, magnesium chloride, magnesium dihydrate, magnesite, magnesium hydroxide, etc. are used in the distilled water and pectin solution they will prevent the formation of the tough viscous bubble of carbon dioxide. If an excess of calcium and/or magnesium ions have been added to the distilled water and pectin solution calcium pectate or magnesium pectate will precipitate out. These pectates are insoluable and, in animals, will readily pass through their digestive systems.

Delephinin, an alkaloid poison found in larkspur, is attached to the pectin in the plants and is usually in the stalks of the plants during growth and in the pods of the seeds later. If the ruminant eating these plants has calcium and magnesium ions present in sufficient quantities, the pectin along with the alkaloid will precipitate out in an insoluable form and the animal will be safe from poisoning.

Barley, a high bloat producer, has twice as much pectin as any of the common grains such as oats and wheat. By feeding calcium magnesium ions in salt mixtures or in the water or feed of the ruminants prevents bloat. Experience has proven that the use of hydrated magnesium oxide mixed with salt (sodium chloride) in a one to four ratio prevents bloat. More particularly, ratios of substantially five to twenty percent of calcium and magnesium oxide and eighty to ninety five percent of sodium chloride are also effective in preventing bloat. Further, no genetic or physiological defects have been noted.

The following method and mixture has been found to be satisfactory in eliminating the pectin related diseases as well as pulmonary emphysema and weak calf syndrome.

MINERAL MIXTURES

| | No. 1 | No. 2 |
|---|---|---|
| Monosodium Phosphate | 23.00 | 46.00 |
| Air Slaked Lime and Hydrated Magnesium Oxide in 4 to 1 ratio | 20.00 | 20.00 |
| Wheat Bran | 10.00 | 10.00 |
| Molasses, dried | 10.00 | 10.00 |
| Salt | 37.00 | 14.00 |
| | 100.00 lbs. | 100.00 lbs. |

These mineral mixtures can be mixed by mixing the wheat bran, dried molasses and one-half of the salt required together. Then the monosodium is added and mixed after which the slaked lime and hydrated magnesium oxide is added and thoroughly mixed.

Forty grams of this mineral mix may then be mixed and added with nine hundred grams of cracked barley or chopped alfalfa hay if the cattle are confined.

If the cattle are on range, the above mineral mixture is made available for them for using at will.

Another ratio for feeding animals specified in parts of the ingredients since animals of different sizes should be given ratios of different weights of material comprises 10 to 50 grams of hydrated lime containing approximately three percent hydrate magnesium oxide with substantially 40 to 200 grams of sodium chloride per day. One formula found to be satisfactory which includes wheat bran for the purpose of keeping the mixture loose under moist conditions, organic iodine, phosphates and so forth is as follows:

50% salt (sodium chloride)
20% monosodium phosphate, including 5% phosphorous
20% hydrated lime including 8% hydrated magnesium oxide
10% wheat bran with or without 0.048% EDTI (organic) iodine A flavor such as about 0.5% of anise may be added.

The addition of the hydrated magnesium oxide causes the pectin to precipitate out of the animal. It also causes saponification by the removal of methyl groups from the pectin. The pectate that is precipitated out is insoluble and the sanponification lessens the chance of foam or jel formations.

While the method of feeding and the mineral mixtures disclosed constitute preferred method and product, it is also to be understood that they are capable of alteration without departing from the spirit of the invention.

What is claimed is:

1. The method of controlling bloat in ruminants eating pectin containing plants comprising the steps of mixing in ratios of 100 pounds,
   20 pounds of hydrated lime containing one part of hydrate magnesium oxide with substantially four parts of sodium chloride,
   23 pounds of monosodium phosphate,
   10 pounds of wheat bran,
   10 pounds of dried molasses, and
   32 pounds of salt,
   and feeding said mixture to the ruminants, said mixture precipitating out pectin as calcium pectate and magnesium pectate.

2. The method set forth in claim 1 wherein the amount of monosodium phosphate is increased to approximately forty six pounds and said sodium chloride is reduced to substantially 14 pounds.

3. The method of controlling bloat in ruminants eating pectin containing plants comprising the steps of mixing a mineral mixture of substantially 10 to 50 grams of hydrated lime containing hydrated magnesium oxide in a ratio of substantially four parts of lime to one part of magnesium oxide with substantially 40 to 200 grams of sodium chloride and feeding said mixture to each ruminant per day, said mixture recipitating out pectin as calcium pectate.

* * * * *